United States Patent
Close

[15] 3,684,100
[45] Aug. 15, 1972

[54] FILTER ASSEMBLY AND DISPOSABLE FILTER ELEMENT THEREFOR

[72] Inventor: Sam Close, R.R. 5, Lebanon, Ind. 46052

[22] Filed: April 5, 1971

[21] Appl. No.: 131,308

[52] U.S. Cl. ..............................................210/444
[51] Int. Cl. .....................................B01d 27/00
[58] Field of Search......210/420, 424, 437, 440, 444, 210/445, 457, 458

[56] References Cited

UNITED STATES PATENTS

| | | | |
|---|---|---|---|
| 2,321,985 | 6/1943 | Briggs | 210/457 X |
| 2,979,208 | 4/1961 | Humbert, Jr. | 210/424 X |
| 3,262,570 | 7/1966 | Gailitis et al. | 210/444 X |
| 3,266,628 | 8/1966 | Price | 210/440 X |
| 3,272,336 | 9/1966 | Humbert, Jr. | 210/458 X |
| 3,524,552 | 8/1970 | Carmon | 210/444 X |

*Primary Examiner*—Reuben Friedman
*Assistant Examiner*—R. W. Burks
*Attorney*—David E. Dougherty and Robert E. Walter

[57] ABSTRACT

In a filter assembly of the type employing a head for controlling the flow of fluid and a bowl detachably secured to the head, a disposable sanitary filter unit which includes an outer impermeable cup-shaped shell is supported by the bowl, and a filter element within the shell is disposed within the shell in the path of fluid flow.

17 Claims, 5 Drawing Figures

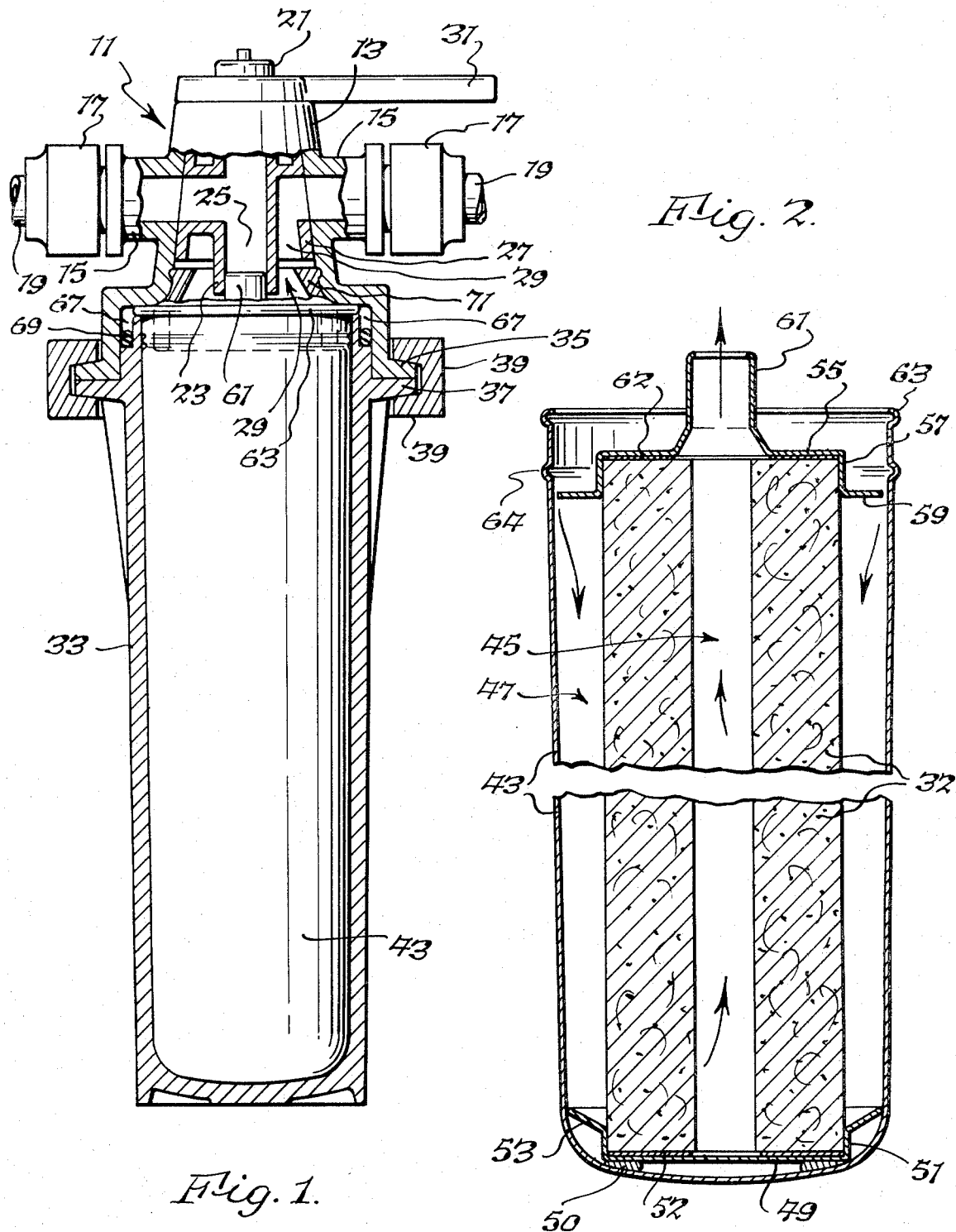

PATENTED AUG 15 1972
3,684,100
SHEET 2 OF 2
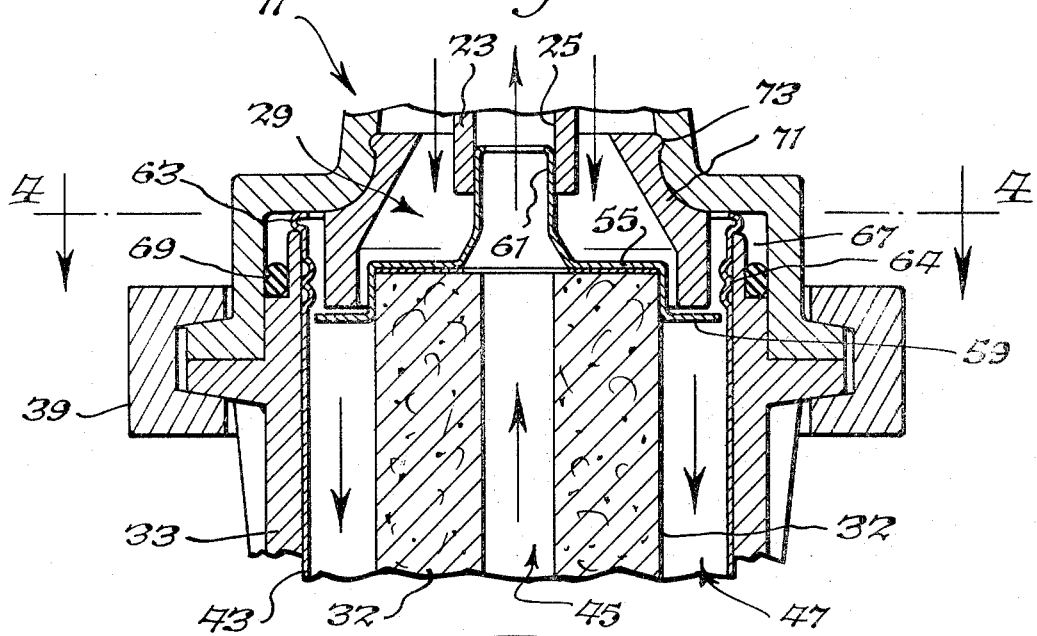
Fig. 3.
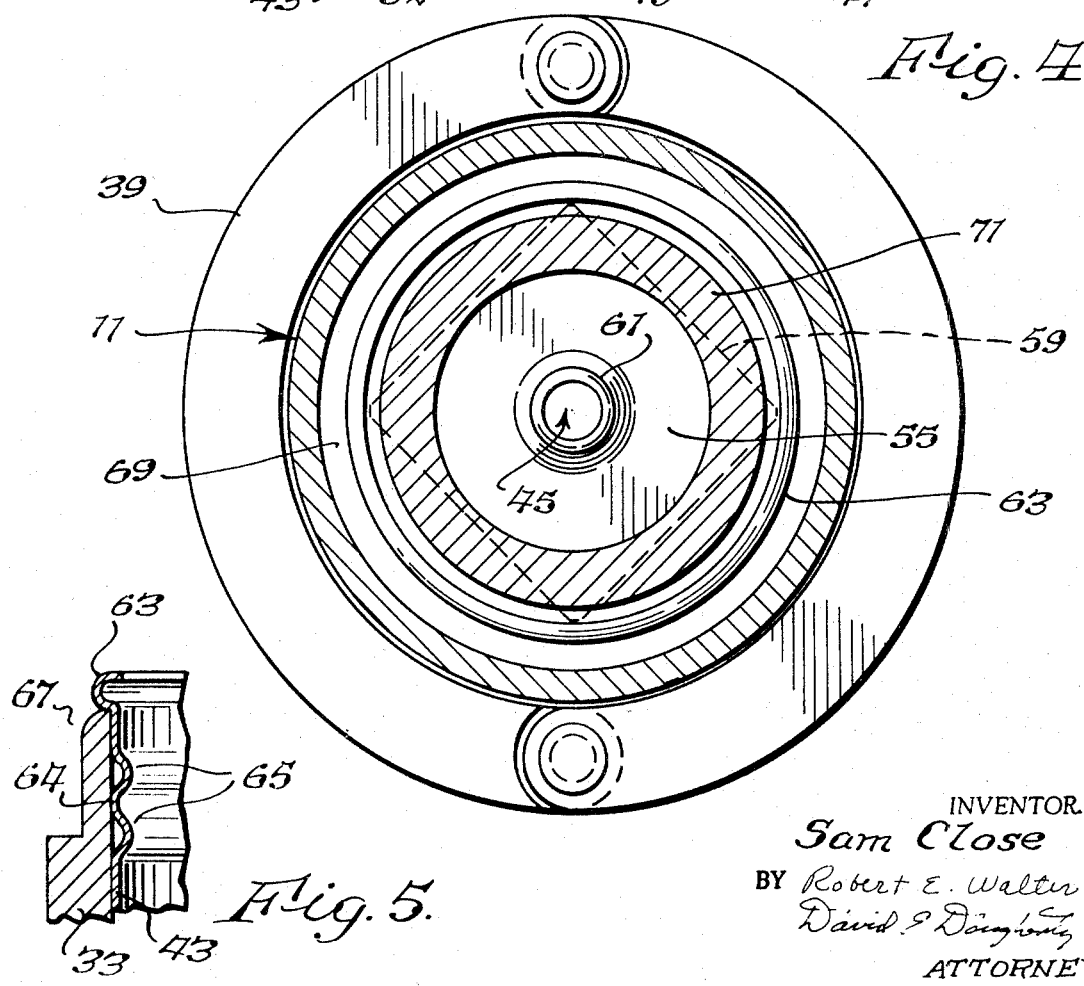
Fig. 4.
Fig. 5.
INVENTOR.
Sam Close
BY Robert E. Walter
David I. Dougherty
ATTORNEY.

FILTER ASSEMBLY AND DISPOSABLE FILTER ELEMENT THEREFOR

BACKGROUND OF THE INVENTION

Filter assemblies employing disposable filter cartridges are extensively used to filter or purify water, gasoline, drycleaning solvents, oils and other fluids.

Filter assemblies presently available are generally constructed with a filter head having an inlet and an outlet on the head communicating with a filter element within a housing. The housing may be either permanently or removably attached to the head. In the former case, the filter element is replaced by removing a cover on the head and withdrawing the cartridge. In the latter case, the housing is first removed and the filter element is then replaced.

In either case, the changing of the filter elements is generally unsanitary and results in the contamination of the environment either through physically contacting the expended filter element or through drippage from the expanded filter element. Furthermore, installation of an unspent or clean element without it being subjected to environmental contamination is difficult. It has been found that prior art filtering assemblies are not suited for maintaining sanitary conditions as found in hospitals, food processing plants, water purification installation and other places where it is desirable to maintain exceptionally sanitary conditions. Heretofore, filter assemblies have been deficient in permitting the rapid and sanitary removal of an expended filter element and installation of clean filter element.

SUMMARY OF THE PRESENT INVENTION

In accordance with the present invention there is provided a filter assembly and a sanitary disposable filter element therefor. A bowl containing the filter element is detachably secured to a head. The filter element or cartridge includes an outer impermeable cup-shaped shell which is supported by the bowl and filter media disposed within the shell. The filter element includes chambers communicating with the head for the flow of fluid through the filter media.

It has been found that a filter assembly employing the improved filter element of the present invention obviates many of the disadvantages found in prior art filter assemblies. The improved filter element permits a changing of filter elements under sanitary conditions that protects the environment against contamination from a spent filter element and protects an unspent filter element against contamination from the environment.

BRIEF DESCRIPTION OF THE DRAWINGS

The drawings which are descriptive of a preferred embodiment of the present invention are as follows:

FIG. 1 is a side elevational view of the filter assembly with a lower portion broken away to illustrate the filter element;

FIG. 2 is a side elevational view of the filter element;

FIG. 3 is a side elevational view of a portion of the filter assembly in section;

FIG. 4 is a sectional view along 4—4 of FIG. 3; and

FIG. 5 is a detailed partial sectional view of the filter element and bowl.

DETAILED DESCRIPTION OF A PREFERRED EMBODIMENT

Referring to FIG. 1 in more detail, the head or valve 11 includes a housing or valve body 13 having laterally extending conduits 15 which function as an inlet for contaminated fluid and an outlet for filtered fluid or fluid by-passing the filter assembly. Conventional connections 17 are utilized for providing a leakproof joint between respective conduits 15 and lines 19 which are conveniently used for conveying fluid to and from the head 11. A gate or plug 21 is rotatably mounted within an opening in the housing and controls the flow of fluid between the conduits 15. The gate 21 includes an inner cylindrical wall 23 forming an inner passage 25 and an outer wall 27 forming an outer concentrically arranged passage 29. Movement of the handle 31 which is in gripping engagement with the gate 21 turns the gate 21 so as to control the flow of fluid to and from the passages 25 and 29 and between the laterally extending conduits 15. Preferably the rotatably mounted gate 21 includes a filter position, a by-pass position and a closed position. The operation and construction of a preferred filter head 11 is described in more detail in a copending application entitled "Valve for a Filter" by Sam Close, filed on the same day as the present application.

It is contemplated that conventional valves can be employed with the filter assembly of the present invention. This would include arrangements wherein the lateral conduits 15 communicate directly with filter media 32 without the utilization of a rotary gate 21. In this latter case, each conduit 15 can include a shut-off valve. Also, various conventional by-pass arrangements may be employed with the filter assembly of the present invention.

A bowl 33 which has a cylindrically shaped wall is detachably secured to the filter head 11. The housing 13 includes an outer enclosure having depending flange 35, at the lower portion thereof. The bowl 33 includes a depending flange 37 matching the flange of the housing 13. A retaining clamp 39 which is hinged and fastened by a pin through overlapping links engages the housing flange 35 and the bowl flange 37 so as to securely mount the bowl 33 to the head 13. The method of attachment of the bowl 33 is not critical to the present invention and other conventional fastening means may be employed.

The retaining clamp 39, bowl 33 and head 11 can be of plastic material, but obviously any desired material suitable for withstanding the pumpage pressure may be desirably employed.

The filter cartridge or element 41 which is positioned within the bowl 33 as illustrated in FIG. 1, includes an impermeable outer shell 43. The shell 43 has a generally cylindrically shaped wall with one cup-shaped end closed and the other open. The outer shell is of thin plastic or other material suitable to provide support for the filter media 32 which is mounted within the shell 43. It is not necessary that the shell 43 be of sufficient strength to withstand the fluid pressure of the system since the shell 43 is supported by the bowl 33. The shell 43 serves to keep the filter media 32 sanitary until used and prevents the bowl 33 from being continuously exposed to the influx of fluid. The contamination is confined to the inside of the shell 43 and does not build up in the bowl 33.

The filter media 32 which is disposed within the shell 43 in the path of fluid flow can comprise any material or combination of material which is suitable for the fluid being filtered and the type of filtration desired, such as particulate removal, or particulate, taste and odor removal. The filter media 32 can be of the surface or depth filtration type, or combinations thereof.

The filter media 32 is preferably annularly shaped and coaxial with the shell 43 so as to form an inner chamber 45 and an outer chamber 47 between the shell and the filter media 32. A retaining member 49 within shell 43 adjacent the closed end is disc-shaped with a retaining flange 51 conforming to and engaging the one end of the filter medium 32 which is annularly shaped. A laterally extending skirt 53 which is dependent from the retaining member 49 contacts the inside surface of the shell 43 thereby maintaining the centering of the filter media 32. The retaining member 49 is secured to the bottom of the shell 43 with an adherent material 50. Sealing material 52 which can be a resin or other adherent material is disposed between the retaining member 49 and filter media 32 to prevent the by-pass of fluid between the inner chamber 45 and the outer chamber 49.

The end of the filter media 32 adjacent the open end of the shell 43 is provided with an end cap 55. The end cap 55 includes peripheral flange 57 which engages the periphery of the filter media 32. A sealing material 62 seals the end cap 55 to the filter media 32. A lip 59 which is rectangularly shaped and projects into the outer chamber 47 includes corners for maintaining the spacing of the filter media 32 from the shell 43 and intermediate portions which aid in radially distributing fluid into the outer chamber 47. An opening in the cap 55 is defined by a narrow outwardly extending neck 61 which communicates with the inner chamber 45. The neck 61 frictionally engages the inner cylindrical wall 23 of the head 11 to provide a connection which permits rotation of the gate 21 while maintaining a fluid seal. As illustrated in the drawings, the neck 61 engages the inside of the inner cylindrical wall 23 but the neck 61 may instead engage the outside surface of the inner cylindrical wall 23. In either case, ring seals may conveniently be provided between the neck 61 and the wall 23. The neck 61 is slideable within the inner cylindrical wall 23 so that expansion or contraction of the filter media 32 can be compensated by movement of the neck 61 within the cylindrical wall 23.

The sealing relationship between the shell 43 and the filter head 11 is illustrated in FIG. 3. The shell 43 includes a rim 63 in the form of a circumferential ridge around the periphery of the open end of the shell 43. The rim 63 which extends over the edge of the bowl 33 engages the inside surface of the head 11 and is slightly compressed therebetween. As illustrated in detail in FIG. 5, the shell 43 is provided with a corrugation 65 in proximity to the rim 63. A corrugation 64 which circumferentially engages the inside surface of the bowl 33 aids in providing a fluid tight seal. As shown in detail in FIG. 5, the corrugation 64 is pressed inwardly when shell 43 is placed in the bowl 35 so as to form folds 65. The upper edge of the bowl 33 includes a slot 67 in which an elastomeric gasket 69 such as an O-ring or U-cup is mounted between the head 11 and the bowl 33.

A volumetric member 71 secured to the inside surface of the head 11 protrudes into the shell 43. The volumetric member 71 displaces fluid within the shell 43. When the filter element 41 is removed for changing, drippage from the head is collected in the shell 43 due to the void left by the volumetric member 71.

The volumetric member 71 is of an annular shape having an outside surface conforming to the inside surface of the head 11. A ridge 73 in the outer periphery of the volumetric member 71 corresponds to a groove in the inside wall of the filter head 11 for snapping the volumetric member 71 into place so that a lower dependent portion displaces fluid within the filter element 41. The volumetric member 71 may be formed of any material that is resistant to corrosion from the fluid being filtered and is conveniently made of plastic or suitable material.

The filter cartridge 41 containing the filter media 32 is manufactured, shipped, stored, and remains in a sanitary condition until installation. The filter media 32 is not touched by the installer. Bacteria and contaminate build-ups during operation are confined to the disposable shell 43 and with each filter change previous accumulations within the shell 43 and filter media 32 are disposed.

The filter media 32 is securely seated in the correct position within the shell 43 at the factory. The machine assembly process eliminates by-passing or improper seating of the filter media 32 within the shell 43. The filter cartridge 41 prevents the bowl 33 from becoming wetted under normal circumstances. Therefore, when changing the cartridge 41, the user need not be concerned with cleaning out the bowl 33.

In operation, the contaminated fluid flows into the outer chamber 47 between the shell 43 and the periphery of filter media 32. The fluid passes through the filter media 32 and into the inner chamber 45 from where it flows through the neck 61. Outward flow through the head 11 is provided through the passage 25 and a laterally extending conduit 15.

To change a cartridge 41 it is merely necessary to remove the retaining clamp 39 and remove the bowl 33 is a downward manner. In this fashion, drippage from the filter head 11 is collected in the shell 43 in the void left by the volumetric member 71. The cartridge 41 can be held in a level position for a period of time to insure that drippage from the filter head 11 has been removed. The filter assembly can be set on a level surface and the shell 43 removed and disposed of without contamination to the environment. A new sanitary filter element 41 may then be installed and the filter assembly replaced.

While preferred embodiments of this invention have been described and illustrated, it is to be recognized that modifications and variations thereof may be made without departing from the spirit and scope of this invention as described in the appended claims.

What is claimed is:

1. A filter assembly comprising: a filter head having an inner passage and an outer passage for the flow of fluid therethrough; a bowl detachably secured to said filter head; an impermeable shell disposed within and supported by said bowl, said shell having one end open and the other end closed; sealing means for engaging the open end to said bowl; a filter media disposed within said shell, said filter media forming an inner chamber and an outer chamber, respectively communicating with the inner passage and outer passage.

2. A filter assembly according to claim 1 wherein said shell is cylindrically shaped and said filter media is annularly shaped thereby forming an inner chamber, the outer chamber being formed between the outer periphery of the filter media and said shell.

3. A filter assembly according to claim 2 wherein said sealing means comprises a rim in the form of a circumferential ridge around the open end of said shell, said ridge being compressed between said filter head and said bowl so as to provide a seal.

4. A filter assembly according to claim 3 including means for sealing said filter media to said shell at the closed end thereof.

5. A filter assembly according to claim 3 including an end cap, said end cap having an outwardly extending neck communicating with the inner passage for the flow of fluid.

6. A filter assembly according to claim 3 including a volumetric member depending from said filter head, said member being provided with an annular portion disposed within said shell whereby fluid within said shell is displaced.

7. A filter assembly comprising: a valve body having a central opening and at least two conduits therethrough, respectively communicating with the central opening; a gate having an outer wall conforming to the central opening and a coaxial inner cylindrical wall, said inner wall and said outer wall forming concentrically arranged inner and outer passages; means mounting said gate within the central opening for providing communication between said inner passage and one conduit and between said outer passage and another conduit when said valve is in a filtering position; a bowl detachably secured to said valve body; an impermeable shell removably disposed within and supported by said bowl, said shell being cylindrically shaped and having one end open and the other end closed; and filter media coaxial with said shell forming an inner chamber and an outer chamber, respectively communicating with said inner passage and said outer passage.

8. A filter assembly according to claim 7 including a seating member at the closed end of said shell comprising a retaining flange engaging the outer periphery of said filter media and a laterally extending skirt depending from the retaining flange, the skirt engaging said outer shell for positioning said filter media.

9. A filter assembly according to claim 7 comprising an end cap having a peripheral flange engaging the periphery of said filter media, a lip depending from said flange projecting into the outer chamber, and a neck adapted to engage said cylindrical wall for the flow of fluid between the inner chamber and the inner passage.

10. A filter assembly according to claim 7 comprising a rim in the form of a circumferential ridge around the open end of said shell, said ridge being compressed between said valve body and said bowl so as to provide a seal preventing the flow of fluid into said bowl.

11. A filter assembly according to claim 7 comprising a volumetric member depending from said valve body and provided with an annular portion thereof disposed within said shell whereby fluid within said shell is displaced.

12. A filter assembly comprising: a valve body having a central opening and at least two conduits therethrough, respectively communicating with the central opening; a gate having an outer wall conforming to the central opening and a coaxial inner cylindrical wall, said inner wall and said outer wall forming concentrically arranged inner and outer passages; means mounting said gate within the central opening for providing communication between said inner passage and one conduit and between said outer passage and another conduit when said valve is in a filtering position; a bowl detachably secured to said valve body; filter media disposed in the path of fluid flow, and an end cap adapted to slideably engage said cylindrical wall for the flow of fluid.

13. A filter assembly according to claim 12 comprising a volumetric member depending from said valve body and provided with an annular portion thereof disposed within said shell whereby fluid within said shell is displaced.

14. A filter assembly according to claim 12 comprising an impermeable shell removably disposed within and supported by said bowl, said shell being cylindrically shaped and having one end open and the other closed; said filter media disposed within said shell.

15. A filter cartridge for a filter head having a depending cylindrical wall for the flow of fluid and a bowl detachably secured to the filter head, said filter cartridge comprising an impermeable shell adapted to be disposed within and supported by the bowl, said shell being cylindrical and having one end open and the other end closed, filter media coaxially disposed within said cylindrical shell thereby forming an inner chamber and an outer chamber, the outer chamber being formed between the outer periphery of the filter media and the inside wall of said shell, an end cap having a peripheral flange engaging the periphery of the filter media, said end cap including an outwardly extending neck communicating with the inner chamber and adapted to slidably engage said cylindrical wall, a rim in the form of a circumferential ridge, the ridge being formed around the open end of said shell and being adapted to be compressed between the filter head and the bowl so as to provide a seal.

16. A filter cartridge according to claim 15 including a seating member at the closed end of said shell comprising a retaining flange engaging the outer periphery of said filter media and a laterally extending skirt depending from the retaining flange, the skirt engaging said outer shell for positioning said filter media.

17. A filter cartridge according to claim 15 wherein said end cap includes a peripheral flange engaging the periphery of said filter media, a lip depending from said flange projecting into the outer chamber.

* * * * *